March 3, 1964 F. E. PARISI 3,123,782
AROUND THE MAST ROTARY COUPLING HAVING SHIELDED STATOR
AND ROTOR RINGS IN NEAR CONTACT TO FORM
TROUGH WAVEGUIDES
Filed Aug. 17, 1959 2 Sheets-Sheet 2

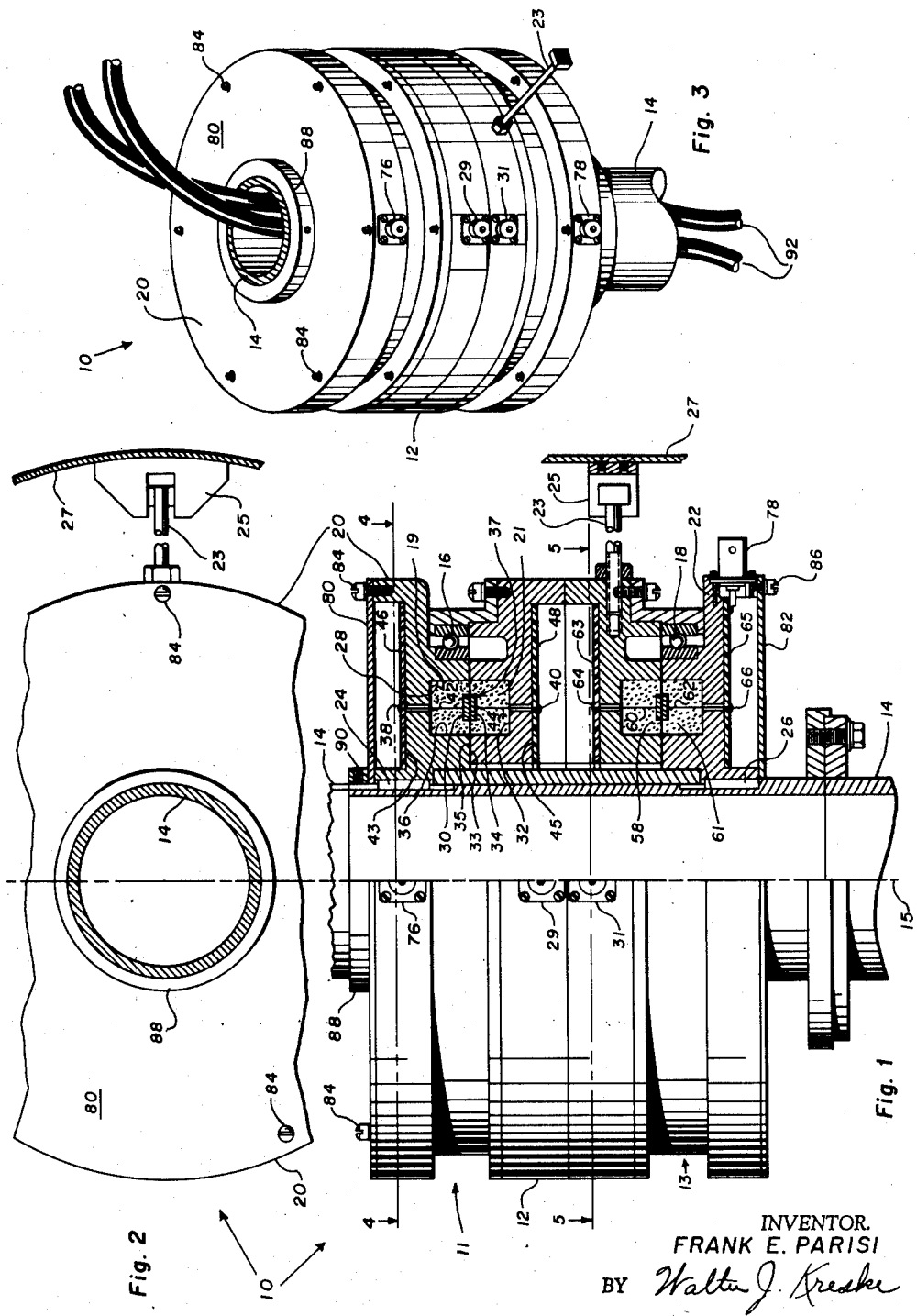

INVENTOR.
FRANK E. PARISI
BY *Walter J. Kreske*
ATTORNEY

United States Patent Office 3,123,782
Patented Mar. 3, 1964

3,123,782
AROUND THE MAST ROTARY COUPLING HAVING SHIELDED STATOR AND ROTOR RINGS IN NEAR CONTACT TO FORM TROUGH WAVEGUIDES
Frank E. Parisi, Waban, Mass., assignor to General Electronic Laboratories, Inc., Cambridge, Mass., a corporation of Massachusetts
Filed Aug. 17, 1959, Ser. No. 835,163
13 Claims. (Cl. 333—98)

This invention relates to rotary joints for microwave transmission lines and more particularly to rotary joints wherein a rotary coupler is circumscribed about a mast or center member for the transmission of electromagnetic microwave energy between conductors in motion with respect to each other.

In many applications such as in rotating antennas and the like, particularly where compactness and space utilization are important factors, it becomes desirable and necessary to provide a hollow mast, in the hollow of which may be carried power lines and other mechanical apparatus in addition to the required antenna feed lines to the rotating antenna. To make such structure practicable, it becomes necessary to provide an electrical coupler or joint for the antenna feed lines capable of relative motion between the input and output ends of the joint to accommodate the rotary motion of the antenna. The construction of such a joint presents serious problems of power transmitting efficiency, conductor and other component cost, wear and reliability where relative motion is involved between such components and conductors.

Pursuant to the present invention these problems have been overcome in a rotary coupler or joint which also incorporates other desirable features and advantages. Among these other features and advantages is the provision of a rotary coupler circumscribed about a hollow mast for releasing the internal hollow portion of the mast for other transmission lines and equipment and having provided therein non-contacting coupler members to insure long life under continuous use conditions. Another desirable feature is that of providing such around the mast rotary joint with a relatively low series impedance. And a further desirable feature is that rotary joint is adaptable for operation over a wide range of frequencies including 160–600 megacycles.

Accordingly, a primary object of the present invention is the provision of a novel rotary joint for the transmission of electromagnetic microwave energy between a stationary and a moving microwave energy-carrying conductor.

Another object is the provision of a rotary joint for the transmission of electromagnetic microwave energy which has non-contacting coupler members.

A further object is the provision of a rotary joint for the transmission of electromagnetic microwave energy which is operable with a relatively low impedance.

And another object is the provision of an around the mast rotary joint for the transmission of electromagnetic microwave energy which is rugged in construction and reliable in its operation.

And a further object is the provision of an around mast rotary joint which readily lends itself to combining with other similar rotary joints to provide a unitary structure for simultaneous servicing a plurality of antennas at similar or different frequencies, as desired.

These and other objects, features and advantages are achieved generally by providing a pair of trough-type transmission lines in opposed relation circumscribed about an axis and having center conductors in fixed relation to the trough, and in proximate relation to each other, and conductor feed lines in electrical engagement with said trough transmission lines at a plurality of positions with intervals therebetween substantially smaller than a quarter-wavelength of the signals carried thereby.

By providing a hollow mast about the axis with the trough-type transmission line circumscribed about the hollow mast and arranged to be supported by the mast in a manner to provide relative motion between the trough-transmission lines, a structure permitting the housing of equipment in the mast is thereby achieved.

By making the troughs as grooves about the axis in respective faces of disc members in approximate relation to each other with the grooves filled with dielectric material having fixed thereon the respective center conductors, a relatively simple and reliable structure for electric signal energy transmission is thereby achieved.

By providing two or more such complete rotary joint structures on the same mast fixed to each other to operate as a single unit a plurality of antennas may thereby be simultaneously serviced.

These features, objects and advantages will become more apparent from the following description taken in connection with the accompanying drawings of a preferred embodiment of the invention, and wherein:

FIG. 1 is a partially side and partially cross-sectional view of an around the mast rotary joint made in accordance with the present invention, and having two rotary couplers.

FIG. 2 is a top view of a portion of the around the mast rotary joint shown in FIG. 1.

FIG. 3 is an isometric view of a rotary joint illustrating the compactness of structure and utility of the hollow mast.

Figure 4:
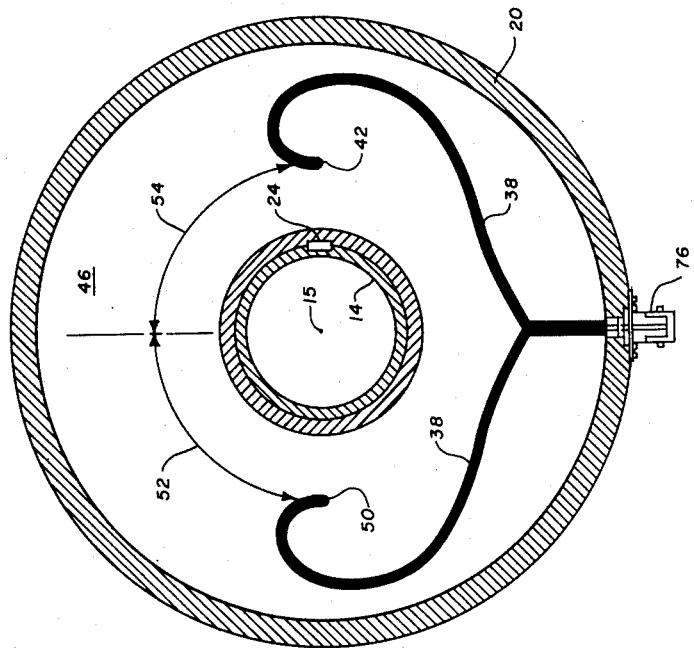
FIG. 4 is a cross-sectional view taken on line 4—4 of FIG. 1 to more clearly show construction.

Referring to FIG. 1 in more detail, a rotary joint assembly made in accordance with the present invention is designated generally by the numeral 10. The rotary joint assembly 10, in the present instance, consists of two around the mast rotary joints 11 and 13. The assembly 10 has a unitary disc-like center structure 12 which rotates about a mast or vertical center member 14 upon ball bearing mountings 16 and 18. The bearings 16 and 18 are fixed to two circular disc-type end members 20 and 22 respectively. Each of the end members 20 and 22 are in the present instance fixed with respect to the mast 14 by keys 24 and 26 respectively, but may, where desired, be left free to rotate with respect to the mast 14 under certain circumstances as will become more apparent as the description progresses. Also, in the present instance the center disc structure 12 is anchored, as by a rod 23 engaging a bracket 25, to a cylindrical-type antenna 27 to rotate integrally with the antenna 27 so that cable feeds (not shown) from the antenna 27 to couplers 29 and 31 will rotate integrally therewith.

The fixed disc type end member 20 has a trough-shaped outer conductor or groove 28 circumscribed about the axis 15 and a dielectric material filler 19 such as polystyrene foam providing a mounting means for a center conductor 30 aligned with an oppositely disposed trough-shaped outer conductor or groove 32 also having a center conductor 34 held in proximate relation to the center conductor 30 by a polystyrene foam filler 21 or other suitable dielectric mounting means. At the adjoining faces 33 and 35 of the disc members 20 and 12 respectively, the outer conductor 32 and center conductor 34 together form a trough-type transmission line in the movable center structure 12 as does also the outer conductor 28 and center conductor 30 in the disc member 20. Because of the small clearance (.005 of an inch or less)

between center conductors 30 and 34 and the large opposed surface areas, the overall structure may be considered electrically as a single center conductor 37 in a hollow outer conductor 36 formed by the outer conductors 28 and 32. The outer conductor 36 and center conductor 37 are circumscribed about the mast 14 as an around the mast transmission line.

The center conductors 30 and 34 have conductor feed lines 38 and 40 which may be micro strip or printed circuit conductors on dielectric spacer plates 46 and 48 respectively such as of Fiberglas, Teflon or other suitable dielectric material. The feed lines 38 and 40 are connected by conductors 42 and 44 respectively to the center conductors 30 and 34 for the transmission of electrical energy. Both feed lines 38 and 40 may be similar in construction to the feed line 38 shown in FIG. 4 with the electrically conductive surfaces 43 and 45 beneath the dielectric spacer plates forming ground planes.

Referring to FIG. 4 in more detail, it will be noted that in addition to the feed connection 42 there is a second diametrically opposite and similar feed connection 50. The reason for there being two feed connections 42 and 50 is to provide geometric dimensions 52 and 54 which are each substantially smaller than ¼ wavelength of the operating frequency band for the rotary joint 11. For example, this particular rotary joint has been found suitable for 160–320 megacycle operation with a physical distance between the feed connections 42 and 50 of 5 inches. It should be understood these dimensions and physical values are mentioned here for illustration only, and not for purposes of limitation.

Figure 5:
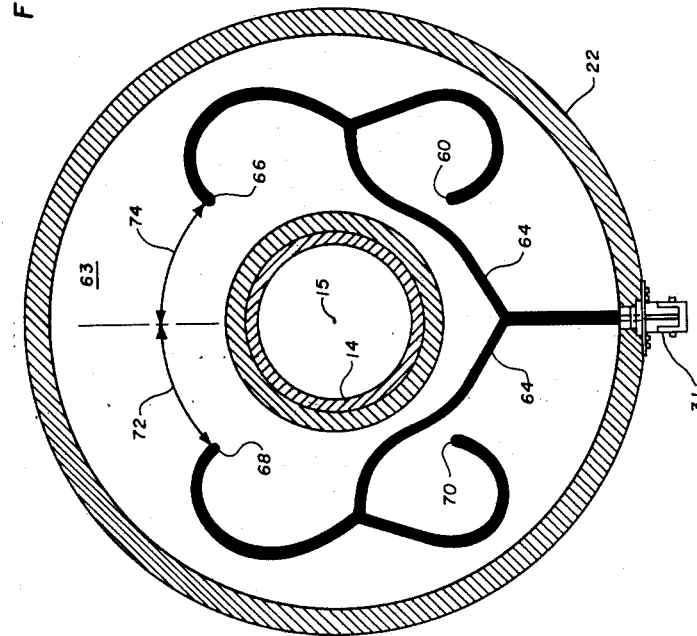
FIG. 5 is a cross-sectional view taken on line 5—5 of FIG. 1 to more clearly show construction.

The assembly 10, as mentioned above, also has a second rotary joint 13 constructed in similar manner to the rotary joint 11 and having center conductors 58 similar to the center conductor 37 and similarly held in place by dielectric material fillers 61. The center conductors 58 are connected by feed conductors 60 and 62 to microstrip feed lines 64 and 66 respectively on dielectric spacer plates 63 and 65 respectively similar to the dielectric plates 46 and 48. Referring to FIG. 5, the coupler feed line 64 is shown to have four feed points 60, 66, 68, and 70, all preferably symmetrically placed at equal distances such as 72 and 74 about the mast 14. These distances as 72 and 74 will be less than ¼ wavelength in the frequency band of operation of the rotary joint 13. For example, suitable operating frequencies for the rotary joint 13 in the present instance lie in the band 300–600 megacycles where a distance or diameter spacing between the feed points 60 and 68 is 5 inches. These frequency band figures are mentioned here for illustrative purposes only, other frequency ranges, including S-band, may also be used by varying geometrical dimensions of the rotary joints 11 and 13 to accommodate such other frequencies.

The curvilinear construction of the strip line or printed circuit conductors 38 and 64 are used to make the length of each section one-quarter wavelength and thereby achieve quarter-wavelength transformers. Also, cross-sectional dimensions are controlled to achieve a desired ohmic value of line. For example, the FIG. 5 network for the rotary joint is shown schematically in FIG. 6 where λ is the wavelength of the signals to be carried by the joint and Ω represents the ohmic value of the particular section.

The dimensions for a very thin strip line may be obtained by use of the formula:

$$Z_0 = \frac{Z_0'}{\left(1 + (2h/\pi b)\left(1 + \ln\frac{\pi b}{2h}\right)\right)}$$

Where:

$$Z_0' = \frac{h}{b}\left(\frac{u}{e}\right)^{1/2}$$

Figure 6:
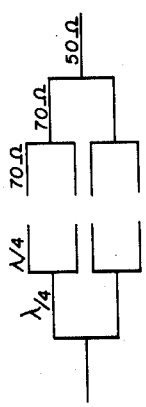
FIG. 6 is a schematic view to clearly show construction of the strip line structure in FIG. 5.

$b$ = Strip width
$h$ = Strip height above the ground plane
$e$ = Effective dielectric constant of the spacer
$u$ = Permeability By way of example, the 50 ohm strip line in FIG. 6 which is suitable for use in FIGS. 4 and 5, by the above formula, may have the dimensions of .155 inch width, .002 inch thickness and separated from the ground plane by a .064 inch thick fiberglass spacer, and the 70 ohm strip lines may have the dimensions of .090 inch width, .002 inch thickness with the same .064 inch thick fiberglass spacer.

Each of the microstrip conductor feed lines 38, 40, 64 and 66 are electrically coupled to the respective inner conductor of coaxial connectors 76, 29, 31, and 78 for easy coupling to suitable coaxial feed lines (not shown).

A suitable closure is provided by closure plates 80 and 82 fastened in place as by screws 84 and 86 to complete the compact assembly 10 and providing a complete enclosure for the microstrip conductors 38 and 66. The spaces between the closure plates 80 and 82 and the respective strip lines 38 and 66 are preferably at least five times the thickness of the spacers 28 and 65 to avoid interference with the electric field. A sleeve 88 secured as by a set screw 90 to the mast 14 may be used to hold the assembly 10 in place on the mast 14.

In the operation of the assembly 10, the cylindrical center structure 12, because of the anchoring rod 23, will follow the rotary movement of the antenna 27 which may have several radiation configurations (not shown) for different operating frequencies coupled through feed lines (not shown) to the respective connectors 29 and 31. The connectors 29 and 31 are electrically coupled for the passage of signal energy through the strip lines 40 and 64, respectively, to the center conductors 37 and 58 respectively, which in turn are coupled through strip lines 38 and 66 to the connectors 76 and 78, respectively, and thereby to suitable equipment (not shown). It should be noted here that the strip metal feed lines 38, 40, 64 and 66 type construction provides a low-cost arrangement for obtaining quarter wavelength transformers as described above.

It should also be noted that this around the mast rotary joint releases the center portion of the mast 14 for carrying additional equipment 92, as power lines or other desired structures.

This invention is not limited to the particular details of construction and operation herein described as equivalents will suggest themselves to those skilled in the art.

What is claimed is:

1. In combination, a pair of trough type transmission lines in opposed relation to each other circumscribed about an axis, each with a center conductor in fixed relation to the respective trough and in proximate relation to each other, means mounting one of said transmission lines for movement about said axis, and electrically conductive feed means coupled to said transmission lines.

2. The combination as in claim 1 wherein the electrically conductive feed means are coupled to the center conductors at a plurality of positions having spacings therebetween which are no greater than one quarter of the wave length of the electric signals to be carried thereby.

3. The combination as in claim 1 wherein the electrically conductive feed means are coupled to the center conductors at a plurality of symmetrically placed positions about said axis and having spacings therebetween which are substantially smaller than one quarter of the wave length of the electric signals to be carried thereby.

4. In combination, a pair of trough type transmission lines in opposed relation to each other circumscribed about an axis, each with a center conductor in fixed relation to the respective trough and in proximate relation to each other, means mounting one of said transmission lines for movement about said axis, and electrically conductive feed means coupled to the center conductors at a plurality of symmetrically placed positions about said axis and having spacings therebetween which are substantially smaller than one quarter wave length of the electric signals to be carried thereby, said feed means for each of said center conductors including a common strip line coupled to a plurality of strip lines in parallel, one for each of the symmetrically placed coupling positions.

5. The combination as in claim 4 wherein the length of the parallel strip lines is approximately equal to one quarter of the wave length of the electric signals to be carried thereby.

6. The combination as in claim 5, wherein the strip lines are proportioned for 50 ohm operation.

7. In combination, a pair of trough type transmission lines in opposed relation to each other, each including a trough shaped conductor circumscribed about an axis and a center conductor in the trough, a dielectric filler in each of the trough shaped conductors fixing said center conductors in place and in close proximity to each other, mounting means coupled to said trough shaped conductors for permitting relative motion therebetween, and electrically conductive feed means coupled to said transmission lines.

8. The combination as in claim 7 wherein the dielectric material is polystyrene foam.

9. In combination, a pair of trough type transmission lines in opposed relation to each other, each including a trough shaped conductor circumscribed about an axis and a center conductor in the form of a flat faced ring about said axis in the trough, dielectric holding means in each of the trough shaped conductors fixing said center conductors in place with the flat faces in close proximity to each other, mounting means coupled to said trough shaped conductors for permitting relative motion therebetween, and electrically conductive feed means coupled to said transmission lines.

10. The combination as in claim 9 wherein the spacing between the faces is no greater than .005 inch.

11. In combination, a rigid mast having an axis, a pair of trough type transmission lines in opposed relation to each other, each including a trough shaped conductor about said mast and a center conductor fixed in each trough and in proximate relation to each other, one of the trough type transmission lines rigidly fixed to said mast, means coupled to the other trough type transmission line for rotative movement of said other transmission line to said mast and axis, and electrically conductive feed means coupled to said transmission lines.

12. In a rotary joint for the transmission of electrical energy, a hollow mast, a pair of circular disk members circumscribed about said mast and having adjoining faces in proximate relation to each other, one of the members in fixed relation to the mast, means mounting the other member in rotative relation to the mast, oppositely disposed grooves circumscribing the mast in the adjoining faces of the disk members, a circular ring shaped conductor in each of the grooves in fixed relation to the respective groove and in proximate relation to each other, and feed lines coupled to the circular conductors at a plurality of positions on each conductor wherein the spacing between positions in the respective conductor is smaller than one quarter of the wave length of the electric signals to be carried thereby.

13. In a rotary joint for the transmission of electrical energy, a hollow mast, a pair of circular disk members circumscribed about said mast and having adjoining faces in proximate relation to each other and opposed faces displaced from each other, means mounting the members for rotation with respect to each other about the mast, oppositely disposed grooves circumscribing the mast in the adjoining faces of the disk members, a circular ring shaped conductor in each of the grooves in fixed relation to the respective groove and in proximate relation to each other, a recess in each of the opposed faces circumscribing the mast, and strip conductors on dielectric spacers in said recesses, the strip conductors coupled to the circular conductors at a plurality of positions on each circular conductor wherein the spacing between positions on the respective circular conductor is smaller than the wave length of the electric signals to be carried thereby.

References Cited in the file of this patent

UNITED STATES PATENTS

| | | |
|---|---|---|
| 2,219,244 | White et al. | Oct. 22, 1940 |
| 2,433,938 | Vasner | Jan. 6, 1948 |
| 2,737,633 | Tomiyasu | Mar. 6, 1956 |

OTHER REFERENCES

Proceedings of the I.R.E., vol 44, No. 8, August 1956, page 2A.

I.R.E. National Convention Record, vol. 6, Part 1, March 1958, pages 78–81.